US010638319B2

(12) United States Patent
Cu et al.

(10) Patent No.: US 10,638,319 B2
(45) Date of Patent: *Apr. 28, 2020

(54) WI-FI CONNECTION METHOD, MOBILE TERMINAL AND STORAGE MEDIUM

(71) Applicant: GUANGDONG OPPO MOBILE TELECOMMUNICATIONS CORP., LTD., Dongguan, Guangdong (CN)

(72) Inventors: Botao Cu, Dongguan (CN); Yadong Hu, Dongguan (CN); Yi Yu, Dongguan (CN); Shimin Jiang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 238 days.

This patent is subject to a terminal disclaimer.

(21) Appl. No.: 15/794,488

(22) Filed: Oct. 26, 2017

(65) Prior Publication Data
US 2018/0242148 A1    Aug. 23, 2018

(30) Foreign Application Priority Data
Feb. 20, 2017   (CN) .......................... 2017 1 0091100

(51) Int. Cl.
*H04W 12/06* (2009.01)
*H04W 48/00* (2009.01)
(Continued)

(52) U.S. Cl.
CPC .......... *H04W 12/06* (2013.01); *H04L 63/083* (2013.01); *H04W 48/00* (2013.01); *H04W 48/20* (2013.01); *H04W 64/006* (2013.01)

(58) Field of Classification Search
CPC ... H04W 12/06; H04W 48/00; H04W 64/006; H04L 63/08
See application file for complete search history.

(56) References Cited

U.S. PATENT DOCUMENTS 9,137,306 B2    9/2015  Jung et al.
10,193,740 B1 *  1/2019  Patel .................. H04L 41/0618
(Continued)

FOREIGN PATENT DOCUMENTS

CN    102231887 A    11/2011
CN    105027620 A    11/2015
(Continued)

OTHER PUBLICATIONS

Riggio et al., "Programming Abstractions for Software-Defined Wireless Networks," IEEE Transactions on Network and Service Management Year: 2015 | vol. 12, Issue: 2 | Journal Article | Publisher: IEEE.*
(Continued)

*Primary Examiner* — Roderick Tolentino (57) ABSTRACT

An embodiment provides a Wireless Fidelity (Wi-Fi) connection method and a mobile terminal. The method includes: a Wi-Fi connection method is provided, which is applied to a mobile terminal and includes: network environment information of a target Access Point (AP) is acquired; N target Wi-Fi connection records corresponding to the target AP is acquired from historical Wi-Fi connection data according to the network environment information of the target AP, the historical Wi-Fi connection data comprising M Wi-Fi connection records, where M is a positive integer and N is a positive integer less than or equal to M; and the target AP is accessed according to the N target Wi-Fi connection records.

15 Claims, 7 Drawing Sheets (51) Int. Cl.
*H04L 29/06* (2006.01)
*H04W 48/20* (2009.01)
*H04W 64/00* (2009.01)

(56) References Cited

U.S. PATENT DOCUMENTS

| | | | | |
|---|---|---|---|---|
| 2004/0090930 | A1* | 5/2004 | Lee | H04L 63/083 370/328 |
| 2007/0294403 | A1* | 12/2007 | Verona | G06F 16/217 709/225 |
| 2013/0100855 | A1 | 4/2013 | Jung et al. | |
| 2014/0047536 | A1* | 2/2014 | Jung | G06F 21/31 726/16 |
| 2014/0315536 | A1* | 10/2014 | Chow | H04W 8/18 455/419 |
| 2015/0094093 | A1* | 4/2015 | Pierce | H04W 64/00 455/456.3 |
| 2015/0142983 | A1 | 5/2015 | Yilmaz | |
| 2015/0365988 | A1 | 12/2015 | Jung et al. | |
| 2016/0036794 | A1* | 2/2016 | Adhya | H04L 63/08 726/4 |
| 2016/0227017 | A1* | 8/2016 | Kotab | H04L 41/00 |
| 2016/0309286 | A1* | 10/2016 | Son | H04L 63/0861 |
| 2017/0290062 | A1* | 10/2017 | Balasingh | H04W 74/0825 |

FOREIGN PATENT DOCUMENTS

| | | |
|---|---|---|
| CN | 105188056 A | 12/2015 |
| CN | 105323244 A | 2/2016 |
| CN | 106973384 A | 7/2017 |
| EP | 2999271 A1 | 3/2016 |
| KR | 20130134872 A | 12/2013 |
| WO | 2013187892 A1 | 12/2013 |
| WO | 2016190655 A1 | 12/2016 |

OTHER PUBLICATIONS

Albayram et al., "A Location-Based Authentication System Leveraging Smartphones," 2014 IEEE 15th International Conference on Mobile Data Management Year: 2014 | vol. 1 | Conference Paper | Publisher: IEEE.*

International Search Report in international application No. PCT/CN2017/104770, dated Dec. 19, 2017.

Written Opinion of the International Search Authority in international application No. PCT/CN2017/104770, dated Dec. 19, 2017.

Supplementary European Search Report in European application No. 17195911.7, dated Mar. 26, 2018.

Albayram et al.,"A Location-Based Authentication System Leveraging Smartphones," 2014 IEEE 15th Internation Conference on Mobile Data Management Year: 2014 | vol. 1 | Conference Paper | Publisher: IEEE.

* cited by examiner

WI-FI CONNECTION METHOD, MOBILE TERMINAL AND STORAGE MEDIUM

CROSS-REFERENCE TO RELATED APPLICATIONS

This application claims priority to Chinese Patent Application No. 201710091100.3 filed on Feb. 20, 2017, the disclosure of which is incorporated by reference herein in its entirety.

TECHNICAL FIELD

The disclosure relates to the technical field of communications, and in particular to a Wireless Fidelity (Wi-Fi) connection method and a mobile terminal.

BACKGROUND

Along with rapid development of the information technology, use of mobile terminals (such as mobile phone and tablet computer) becomes increasingly popular. Users have higher requirements on the mobile terminals. They not only require the mobile terminal to have a relatively high processing speed, but also increasingly rely upon Wi-Fi connection. Along with popularization of the mobile terminals and the Wi-Fi, the event of accessing a Wi-Fi network through a mobile terminal occurs more and more frequently.

SUMMARY

A first aspect of the embodiments of the disclosure provides a Wi-Fi connection method, which is applied to a mobile terminal and includes: network environment information of a target Access Point (AP) is acquired; N target Wi-Fi connection records corresponding to the target AP is acquired from historical Wi-Fi connection data according to the network environment information of the target AP, the historical Wi-Fi connection data comprising M Wi-Fi connection records, where M is a positive integer and N is a positive integer less than or equal to M; and the target AP is accessed according to the N target Wi-Fi connection records.

A second aspect of the embodiments of the disclosure provides a mobile terminal, which includes: a processor and a memory, the processor calls a code or instruction in the memory to execute the Wi-Fi connection method as described in the first aspect.

A third aspect of the embodiments of the disclosure provides a non-transitory computer readable storage medium, storing instructions, which, when executed by a processor, cause the processor to execute the Wi-Fi connection method as described in the first aspect.

BRIEF DESCRIPTION OF DRAWINGS

In order to describe the technical solutions in the embodiments of the disclosure more clearly, the drawings required to be used for descriptions about the embodiments will be simply introduced below. Of course, the drawings described below are some embodiments of the disclosure. Those skilled in the art may further obtain other drawings according to these drawings without creative work.

DETAILED DESCRIPTION

The technical solutions in the embodiments of the disclosure will be clearly and completely described below in connection with the drawings in the embodiments of the disclosure. Of course, the described embodiments are not all embodiments but part of embodiments of the disclosure. All other embodiments obtained on the basis of the embodiments in the disclosure by those skilled in the art without creative work shall fall within the scope of protection of the invention.

Terms "first", "second", "third", "fourth" and the like in the specification, claims and drawings of the disclosure are intended not to describe a specific sequence but only to distinguish different objects. In addition, terms "include" and "have" and any transformation thereof are intended to cover nonexclusive inclusions. For example, a process, method, system, product or equipment including a series of operations or units is not limited to the listed operations or units, but may further include operations or units which are not listed, or may further include other operations or units intrinsic to the process, the method, the product or the equipment.

"Embodiment" mentioned in the disclosure means that specific characteristics, structures or properties described with reference to an embodiment may be included in at least one embodiment of the disclosure. This word displayed at each position in the specification does not refer to the same embodiment as well as an independent or alternate embodiment mutually exclusive to other embodiments. It may be explicitly and implicitly understood by those skilled in the art that the embodiments described in the disclosure may be combined with the other embodiments.

A mobile terminal described in the embodiments of the disclosure may include a smart phone (such as an Android phone, an iOS phone and a Windows phone), a tablet computer, a palmtop computer, a notebook computer, a Mobile Internet Device (MID), wearable equipment or the like, which are not exhausted by only listed as examples, and includes, but not limited to, the listed mobile terminals.

Normally, in order to access an Access Point (AP), all of the Service Set Identifier (SSID), the encryption scheme and the password of the AP being inputted shall be correct. In practice, when a user arrives at a place, he/she may have to take some efforts to obtain the password of the AP for connection. However, due to some maloperation in use or the limitation of the number of APs stored in a mobile terminal, some AP records may be cleared. In this case, the user has to input the password again for accessing the AP which has ever been accessed before. If the password is incorrectly input for multiple times, Wi-Fi connection efficiency becomes very low.

In at least one embodiment, historical Wi-Fi connection data in the embodiments of the disclosure may include multiple Wi-Fi connection records, and each Wi-Fi connection record may include an AP which has ever been connected (that is, the AP is successfully accessed). Of course, each Wi-Fi connection record may further include attribute information of the AP and network environment information (such as a position of a mobile terminal, signal strengths and the like of surrounding APs and attribute information of the surrounding APs), and the attribute information may include at least one of: an SSID, a Basic SSID (BSSID), an encryption scheme, a password and the like. Of course, every time when the mobile terminal successfully accesses a certain AP, a Wi-Fi connection record may be generated, and an SSID, BSSID, encryption scheme and password of the AP and the position of the mobile terminal are recorded.

In some embodiments of the disclosure, a Wi-Fi connection method is provided, which is applied to a mobile terminal and includes: network environment information of a target Access Point (AP) is acquired; N target Wi-Fi connection records corresponding to the target AP is acquired from historical Wi-Fi connection data according to the network environment information of the target AP, the historical Wi-Fi connection data comprising M Wi-Fi connection records, where M is a positive integer and N is a positive integer less than or equal to M; and the target AP is accessed according to the N target Wi-Fi connection records.

In some embodiments of the disclosure, a mobile terminal is provided, which includes: a processor and a memory, the processor calls a code or instruction in the memory to execute the Wi-Fi connection method as described above.

In some embodiments of the disclosure, a non-transitory computer readable storage medium is provided, the non-transitory computer readable storage medium stores instructions, which, when executed by a processor, cause the processor to execute the Wi-Fi connection method as described above.

Figure 1A:
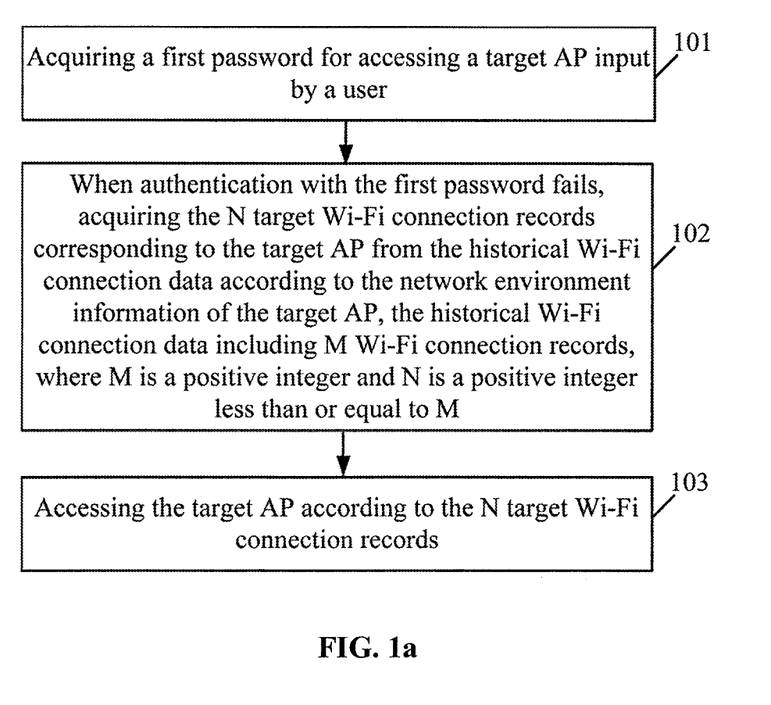
FIG. 1a illustrates a flowchart of a Wi-Fi connection method according to an embodiment of the disclosure.

FIG. 1a illustrates a flowchart of a Wi-Fi connection method according to an embodiment of the disclosure. The Wi-Fi connection method described in the embodiment includes the following operations in blocks illustrated in FIG. 1a. The method can begin at block 101.

At block 101, a first password for accessing a target AP, input by a user, is acquired.

Here, the first password may be at least one of: a character string, fingerprint information, voice information, iris information and the like. A mobile terminal may display a Wi-Fi list in a display screen of the mobile terminal. The Wi-Fi list may include AP information of multiple APs, the target AP may be selected, and the user may input the first password of the target AP.

At block 102, when authentication with the first password fails, N target Wi-Fi connection records corresponding to the target AP are acquired from historical Wi-Fi connection data according to network environment information of the target AP, the historical Wi-Fi connection data including M Wi-Fi connection records, where M is a positive integer and N is a positive integer less than or equal to M.

Here, the target AP may perform authentication with the first password, and may allow the mobile terminal to access the target AP when the authentication with the first password succeeds. When the authentication with the first password fails, the N target Wi-Fi connection records corresponding to the target AP may be acquired from the historical Wi-Fi connection data according to the network environment information of the target AP. For example, the N target Wi-Fi connection records corresponding to the target AP may be acquired from the historical Wi-Fi connection data according to an SSID of the target AP. For another example, the N target Wi-Fi connection records corresponding to the target AP may be acquired from the historical Wi-Fi connection data according to an encryption scheme of the target AP. For another example, the N target Wi-Fi connection records corresponding to the target AP may be acquired from the historical Wi-Fi connection data according to the SSID and encryption scheme of the target AP.

Figure 1B:
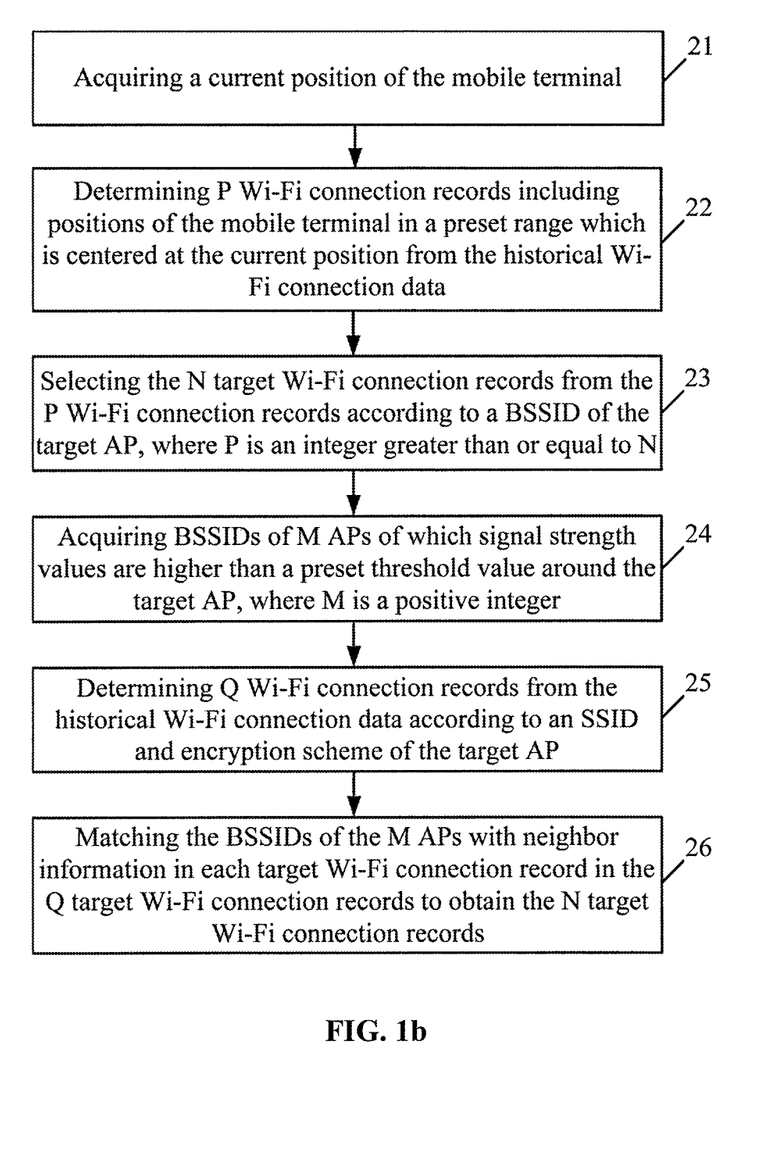
FIG. 1b illustrates a flowchart of operations for acquiring N target Wi-Fi connection records from historical Wi-Fi connection data according to an embodiment of the disclosure.

In at least one embodiment, each Wi-Fi connection record includes AP information of an AP and a position of a mobile terminal. Acquisition of the N target Wi-Fi connection records corresponding to the target AP from the historical Wi-Fi connection data according to the network environment information of the target AP in block 102 may include the following operations, as illustrated in FIG. 1b.

At operation 21, a current position of the mobile terminal is acquired.

At operation 22, P Wi-Fi connection records including positions of the mobile terminal in a preset range which is centered at the current position are determined from the historical Wi-Fi connection data.

At operation 23, the N target Wi-Fi connection records are selected from the P Wi-Fi connection records according to a BSSID of the target AP, where P is an integer greater than or equal to N.

Here, the mobile terminal may determine the current position of the mobile terminal through a Global Positioning System (GPS), or, the mobile terminal may determine the current position of the mobile terminal through a Wi-Fi positioning technology. The current position of the mobile terminal may be represented by a latitude and a longitude. For example, the current position may be represented to be 113° 46' east longitude and 22° 27' north latitude. Of course, if the current position of the mobile terminal is determined by adopting the Wi-Fi positioning technology, a position of a certain AP found by a current cycle of Wi-Fi scanning is determined as the position of the mobile terminal, and the position of the AP, if being marked on an indoor map, may be determined as a point (which represents the position of the mobile terminal).

For example, every time when the user is successfully connected to an AP, a BSSID and password of the AP and the position of the mobile terminal may be recorded to form Wi-Fi connection information of the AP, which is stored in a certain file of the mobile terminal. The file may be set to be input-only, and is configured to record information of all APs which have ever been accessed, thereby obtaining historical Wi-Fi connection data. When the user inputs a password for accessing a certain AP, if the password is incorrect, the mobile terminal, according to the current position of the mobile terminal, searches historical records for all APs which have ever been accessed and have the same BSSID in a preset range (for example, a range of 10 meters) of the position, and AP information in these Wi-Fi connection records is stored in a preset list. If there is only one record in the preset list, a password of a matched AP is adopted for connection, and if there are multiple APs, the target AP is connected by traversing with passwords of these APs. Therefore, a success rate of AP connection may be increased.

In at least one embodiment, acquisition of the N target Wi-Fi connection records corresponding to the target AP from the historical Wi-Fi connection data according to the network environment information of the target AP in block 102 may include the following operations.

At operation 24, BSSIDs of M APs of which signal strength values are higher than a preset threshold value around the target AP are acquired, where M is a positive integer.

At operation 25, Q Wi-Fi connection records are determined from the historical Wi-Fi connection data according to an SSID and encryption scheme of the target AP.

At operation 26, the BSSIDs of the M APs are matched with neighbor information in each target Wi-Fi connection record in the Q target Wi-Fi connection records to obtain the N target Wi-Fi connection records, Here the neighbor information in the target Wi-Fi connection records includes the BSSIDs of X APs in the BSSIDs of the M APs, where X is a positive integer less than or equal to M.

Here, the neighbor information in each target Wi-Fi connection record mainly refers to that neighbor information of an AP is formed by attribute information of APs of which signal strength is higher than a certain threshold value around the AP when the mobile terminal is connected to the AP. X may be set by the user or may be a system default value. For example, every time when the user is successfully connected to an AP, an SSID, BSSID, encryption scheme and password of the AP and at most M (for example, M=5) surrounding APs of which signal strengths are higher than a preset threshold value R (for example, R=−80 db) (these surrounding APs meeting this condition may be called neighbor information of the AP) are recorded. All the information forms historical Wi-Fi connection data of the AP, and is stored in a certain file of the mobile terminal together. The file is set to be input-only, and records Wi-Fi connection records of all APs which have ever been connected. The user inputs a password for accessing a certain AP. If the password is incorrect, a Wi-Fi list is acquired, the Wi-Fi list is matched with information of APs stored in historical Wi-Fi connection data according to information (SSIDs, BSSIDs and encryption schemes) of currently found APs in combination with an environment where the AP is currently located (at most M found APs of which signal strengths are higher than R are extracted), and if an SSID (BSSID) or/and encryption scheme of the AP is/are the same as the APs stored in the historical Wi-Fi connection data and the BSSIDs of the M found APs are equal to BSSIDs of at least N (N<M, for example, N=3) APs in neighbor information of the AP in historical records, it is determined that the matching succeeds.

At block 103, the target AP is accessed according to the N target Wi-Fi connection records.

Here, the N target Wi-Fi connection records include N passwords, so that the target AP may be accessed according to the N passwords respectively; and if the password of the target AP is one of the N passwords, the target AP may be accessed in the N cycles of trying process.

Figure 1C:
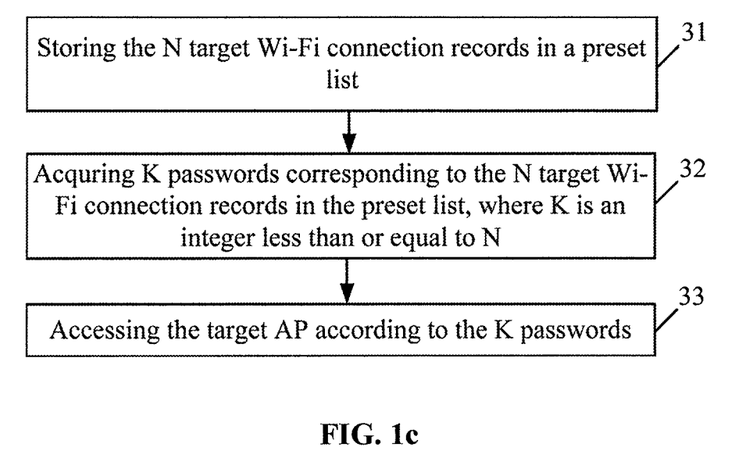
FIG. 1c illustrates a flowchart of operations for accessing the target AP according to the N target Wi-Fi connection records according to an embodiment of the disclosure.

In at least one embodiment, the target AP is accessed according to the N target Wi-Fi connection records in block 103 may include the following operations, as illustrated in FIG. 1c.

At operation 31, the N target Wi-Fi connection records are stored in a preset list.

At operation 32, K passwords corresponding to the N target Wi-Fi connection records in the preset list are acquired, where K is an integer less than or equal to N.

At operation 33, the target AP is accessed according to the K passwords.

Here, the mobile terminal may store the N target Wi-Fi connection records in the preset list, and the preset list may be set by the user (for example, specific entries in the preset list, for example, the preset list may include multiple records and each record includes an SSID, a BSSID, an encryption scheme and a password). As shown in Table 1, an example of the preset list is shown. Of course, the preset list may also be displayed in the display screen of the mobile terminal. Passwords may be extracted from the preset list. Since the N target Wi-Fi connection records may include at least two Wi-Fi connection records with the same password, the K passwords may be obtained, where K is an integer less than or equal to N. Then, the target AP is accessed according to the K passwords. For example, when K is 3, the three passwords are "abcded", "112239" and "xxx123" respectively. Firstly, the password "abcded" may be used to access the target AP; in case of failure, then the password "112239" may be used to access the target AP; in case of failure, then the password "xxx123" may be used to access the target AP.

TABLE 1

| AP | SSID | BSSID | Encryption scheme | password |
|----|------|-------|-------------------|----------|
| 1 | Cathay | A1 | WPA_PSK | 888888 |
| 2 | 118 | B1 | WPA_PSK | Admini |
| 3 | China-net | C1 | WPA_PSK | 1 + 1 = 2 |

The embodiment of the disclosure may be applied to the following specific application scenario. For example, the user adds a hidden AP, and inputs an SSID, an encryption scheme and a password. Whether an AP with the same SSID and encryption scheme exists in a configuration of a stored AP or not is detected, and if YES, a password of the stored AP is backed up before the configuration of the AP is covered. If an incorrect password is input for connection, it is prompted that the password is incorrect. If the password is incorrect, a configuration of the added AP is modified, and the password of the AP is remodified into the password which is backed up before. In this way, it may be ensured that the AP which is stored before may still be connected, and the problem of incorrect password may be solved. For example, the configuration of the AP stored before includes: the SSID "TEST", the encryption scheme "WAP_PSK" and the password "12345678", the configuration of the added hidden AP includes: the SSID "TEST", the encryption scheme "WPA_PSK" and the password "00000000", then the password of "TEST" may be covered by "00000000" in the adding process, which may make the AP stored before cannot be normally connected, and if connection to the added hidden AP fails, the password is recovered to be "12345678", and then the AP stored before can still be normally connected.

It can be seen that, according to the embodiment of the disclosure, a first password for accessing a target AP, input by a user, is acquired; when authentication with the first password fails, N target Wi-Fi connection records corresponding to the target AP are acquired from historical Wi-Fi connection data according to network environment information of the target AP, the historical Wi-Fi connection data including M Wi-Fi connection records, where M is a positive integer and N is a positive integer less than or equal to M; and the target AP is accessed according to the N target Wi-Fi connection records. Therefore, the Wi-Fi connection records of the target AP may be acquired from the historical Wi-Fi connection data, the target AP may be accessed according to the Wi-Fi connection records. In this way, Wi-Fi connection efficiency may be improved.

Figure 2:
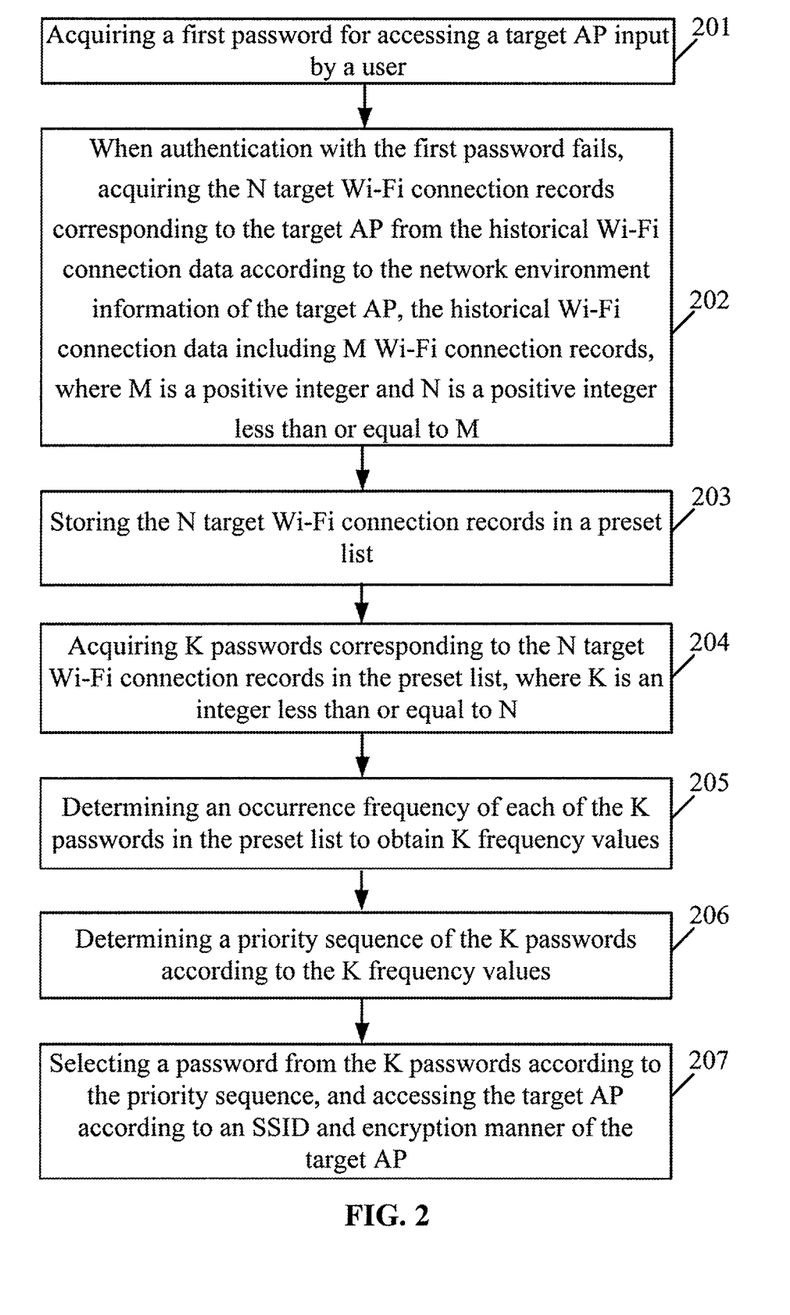
FIG. 2 illustrates a flowchart of a Wi-Fi connection method according to an embodiment of the disclosure.

FIG. 2 illustrates a flowchart of a Wi-Fi connection method according to an embodiment of the disclosure. The Wi-Fi connection method described in the embodiment includes the following operations in blocks illustrated in FIG. 2. The method can begin from block 201.

At block 201, a first password for accessing a target AP, input by a user, is acquired.

At block 202, when authentication with the first password fails, N target Wi-Fi connection records corresponding to the target AP are acquired from historical Wi-Fi connection data according to network environment information of the target AP, the historical Wi-Fi connection data including M Wi-Fi connection records, where M is a positive integer and N is a positive integer less than or equal to M.

At block 203, the N target Wi-Fi connection records are stored in a preset list.

Here, a mobile terminal may store the N target Wi-Fi connection records in the preset list, and the preset list may be set by the user (for example, specific entries in the preset list). Of course, the preset list may also be displayed in a display screen of the mobile terminal. Passwords may be extracted from the preset list. Since the N target Wi-Fi connection records may include at least two Wi-Fi connection records with the same password, K passwords may be obtained, where K is an integer less than or equal to N. Then, the target AP may be accessed according to the K passwords. For example, when K is 3, the three passwords are "abcded", "112239" and "xxx123" respectively. Firstly, the password "abcded" may be used to access the target AP; in case of failure, then the password "112239" may be used to access the target AP; in case of failure, then the password "xxx123" may be used to access the target AP.

At block 204, acquiring K passwords corresponding to the N target Wi-Fi connection records in the preset list are acquired, where K is an integer less than or equal to N.

At block 205, an occurrence frequency of each of the K passwords in the preset list are determined to obtain K frequency values.

Here, the N target Wi-Fi connection records may at most include N different passwords. However, normally, places for activities of the user are relatively concentrated, so that the same AP may be accessed in the same place for activities, and a used password may also be the same. Therefore, K different passwords may exist in the N target Wi-Fi connection records, the occurrence frequency of each of the K passwords in the N target Wi-Fi connection records is also different, and a ratio of the occurrence frequency of each password to N may be determined as the frequency of the password. In this way, the frequency of each of the K passwords may be determined.

At block 206, a priority sequence of the K passwords is determined according to the K frequency values.

Here, a principle for determining the priority sequence in the embodiment of the disclosure is that: if a frequency value is higher, a priority is higher, or, if the frequency value is lower, the priority is lower.

At block 207, a password is selected from the K passwords according to the priority sequence, and the target AP is accessed according to an SSID and encryption scheme of the target AP.

Here, after the priority sequence is determined, the password may be selected from the K passwords according to the priority sequence. For example, there are three passwords A, B and C, and corresponding frequency values thereof are a1, b1 and c1, Here, c1>a1>b1. If a priority sequence is determined according to a principle that a priority is higher if a frequency value is higher, the password C may be firstly selected, and the target AP may be accessed according to the password C and the SSID and encryption scheme of the target AP. In case of failure, the password A may be selected, the target AP may be accessed according to the password A and the SSID and encryption scheme of the target AP, and so on.

It can be seen that, according to the embodiment of the disclosure, a first password for accessing a target AP, input by a user, is acquired; when authentication with the first password fails, N target Wi-Fi connection records corresponding to the target AP are acquired from historical Wi-Fi connection data according to network environment information of the target AP, the historical Wi-Fi connection data including M Wi-Fi connection records, where M is a positive integer and N is a positive integer less than or equal to M; the N target Wi-Fi connection records are stored in the preset list; the K passwords corresponding to the N target Wi-Fi connection records in the preset list are acquired, where K is an integer less than or equal to N; the occurrence frequency of each of the K passwords in the preset list is determined to obtain the K frequency values; the priority sequence of the K passwords is determined according to the K frequency values; the password is selected from the K passwords according to the priority sequence; and the target AP is accessed according to the SSID and encryption scheme of the target AP. Therefore, the Wi-Fi connection records of the target AP may be acquired from the historical Wi-Fi connection data, and the target AP may be accessed according to the Wi-Fi connection records. In this way, Wi-Fi connection efficiency may be improved.

The below is a device for implementing the abovementioned Wi-Fi connection method, specifically as follows.

Figure 3A:
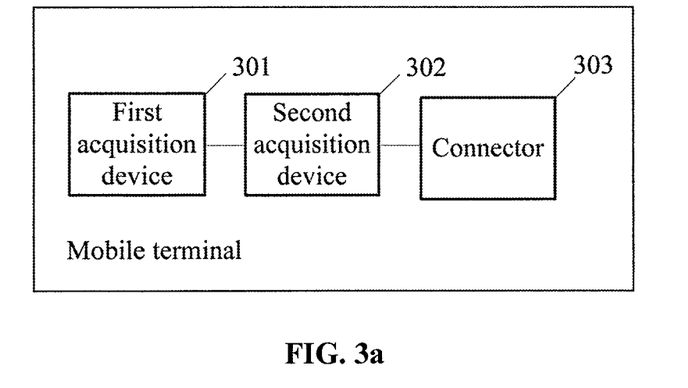
FIG. 3a illustrates a structure diagram of a mobile terminal according to an embodiment of the disclosure.

FIG. 3a illustrates a structure diagram of a mobile terminal according to an embodiment of the disclosure. The mobile terminal described in the embodiment includes: a first acquisition device 301, a second acquisition device 302 and a connector 303, specifically as follows.

The first acquisition device 301 is configured to acquire a first password for accessing a target AP input by a user.

The second acquisition device 302 is configured to, when authentication with the first password fails, acquire N target Wi-Fi connection records corresponding to the target AP from historical Wi-Fi connection data according to network environment information of the target AP, the historical Wi-Fi connection data including M Wi-Fi connection records, where M is a positive integer and N is a positive integer less than or equal to M.

The connector 303 is configured to access the target AP according to the N target Wi-Fi connection records.

Figure 3B:
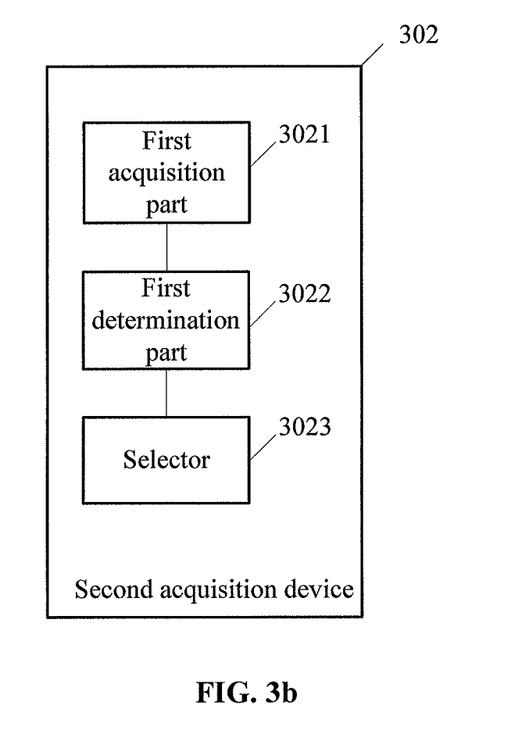
FIG. 3b illustrates a structure diagram of a second acquisition device of a mobile terminal described in FIG. 3a according to an embodiment of the disclosure.

In at least one embodiment, as shown in FIG. 3b, FIG. 3b illustrates a specific detailed structure of the second acquisition device 302 of the mobile terminal described in FIG. 3a. Each Wi-Fi connection record includes AP information of an AP and a position of the mobile terminal. The second acquisition device 302 may include: a first acquisition part 3021, a first determination part 3022 and a selector 3023, specifically as follows.

The first acquisition part 3021 is configured to acquire a current position of the target AP.

The first determination part 3022 is configured to determine P Wi-Fi connection records including positions of the mobile terminal in a preset range which is centered at the current position from the historical Wi-Fi connection data.

The selector 3023 is configured to select the N target Wi-Fi connection records from the P Wi-Fi connection records according to a BSSID of the target AP, where P is an integer greater than or equal to N.

Figure 3C:
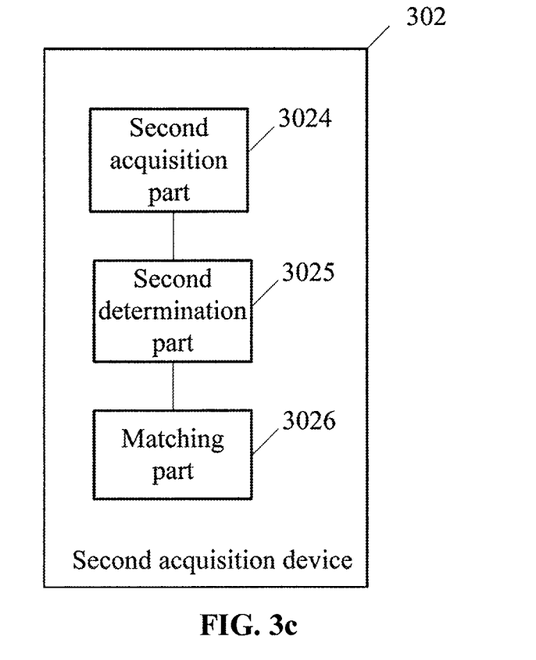
FIG. 3c illustrates another structure diagram of a second acquisition device of a mobile terminal described in FIG. 3a according to an embodiment of the disclosure.

In at least one embodiment, as shown in FIG. 3c, FIG. 3c illustrates another specific detailed structure of the second acquisition device 302 of the mobile terminal described in FIG. 3a. The second acquisition device 302 may include: a second acquisition part 3024, a second determination part 3025 and a matching part 3026, specifically as follows.

The second acquisition part 3024 is configured to acquire BSSIDs of M APs of which signal strength values are higher than a preset threshold value around the target AP.

The second determination part 3025 is configured to determine Q Wi-Fi connection records from the historical Wi-Fi connection data according to an SSID and encryption scheme of the target AP.

The matching part 3026 is configured to match the BSSIDs of the M APs with neighbor information in each target Wi-Fi connection record in the Q target Wi-Fi connection records to obtain the N target Wi-Fi connection records. The neighbor information in the target Wi-Fi connection records includes the BSSIDs of X APs adjacent to the APs in the target Wi-Fi connection records.

Figure 3D:
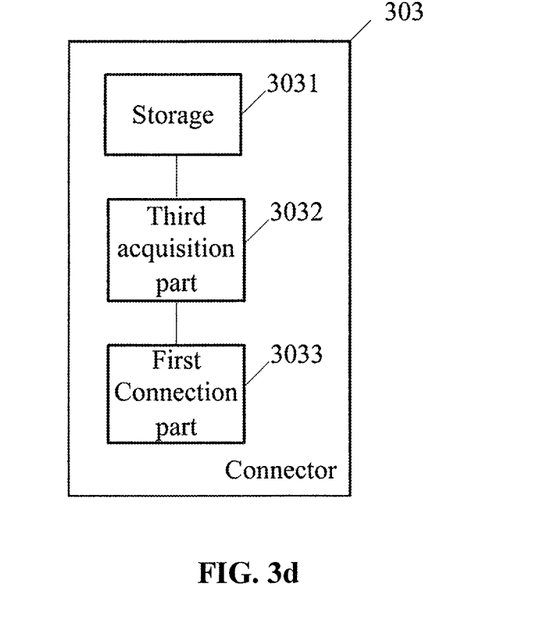
FIG. 3d illustrates a structure diagram of a connector of a mobile terminal described in FIG. 3a according to an embodiment of the disclosure.

In at least one embodiment, as shown in FIG. 3d, FIG. 3d illustrates another specific detailed structure of the connector 303 of the mobile terminal described in FIG. 3a. The connector 303 may include: a storage 3031, a third acquisition part 3032 and a first connection part 3033, specifically as follows.

The storage 3031 is configured to store the N target Wi-Fi connection records in a preset list.

The third acquisition part 3032 is configured to acquire K passwords corresponding to the N target Wi-Fi connection records in the preset list, where K is an integer less than or equal to N.

The first access part 3033 is configured to access the target AP according to the K passwords.

Further, in at least one embodiment, the first connection part 3033 may include: a third determination part (not shown) and a second connection part (not shown), specifically as follows.

The third determination part is configured to determine an occurrence frequency of each of the K passwords in the preset list to obtain K frequency values.

The third determination part is further specifically configured to determine a priority sequence of the K passwords according to the K frequency values.

The second connection part is configured to select a password from the K passwords according to the priority sequence, and access the target AP according to the SSID and encryption scheme of the target AP.

It can be seen that, according to the mobile terminal described in the embodiment of the disclosure, a first password for accessing a target AP, input by a user, is acquired; when authentication with the first password fails, N target Wi-Fi connection records corresponding to the target AP are acquired from historical Wi-Fi connection data according to network environment information of the target AP, the historical Wi-Fi connection data including M Wi-Fi connection records, where M is a positive integer and N is a positive integer less than or equal to M; and the target AP is accessed according to the N target Wi-Fi connection records. Therefore, the Wi-Fi connection records of the target AP may be acquired from the historical Wi-Fi connection data, the target AP may be accessed according to the Wi-Fi connection records. In this way, Wi-Fi connection efficiency may be improved.

Figure 4:
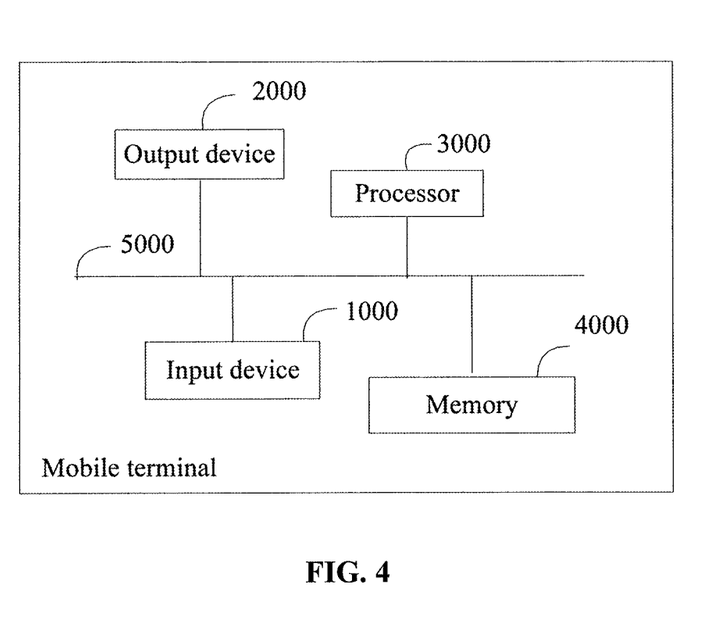
FIG. 4 illustrates a structure diagram of a mobile terminal according to an embodiment of the disclosure.

FIG. 4 illustrates a structure diagram of a mobile terminal according to an embodiment of the disclosure. The mobile terminal described in the embodiment includes: at least one input device 1000, at least one output device 2000, at least one processor 3000, such as a Central Processing Unit (CPU), and a memory 4000, the input device 1000, the output device 2000, the processor 3000 and the memory 4000 being connected through a bus 5000.

Here, the input device 1000 may specifically be a touch panel, a physical button or a mouse.

The output device 2000 may specifically be a display screen.

The memory 4000 may be a high-speed Random Access Memory (RAM), and may also be a non-volatile memory, such as a disk memory. The memory 4000 is configured to store a set of program codes, and the input device 1000, the output device 2000 and the processor 3000 are configured to call the program codes stored in the memory 4000 to execute the following operations.

The processor 3000 is configured to: acquire a first password for accessing a target AP input by a user; when authentication with the first password fails, acquire N target Wi-Fi connection records corresponding to the target AP from historical Wi-Fi connection data according to network environment information of the target AP, the historical Wi-Fi connection data including M Wi-Fi connection records, where M is a positive integer and N is a positive integer less than or equal to M; and access the target AP according to the N target Wi-Fi connection records.

In at least one embodiment, each Wi-Fi connection record includes AP information of an AP and a position of the mobile terminal, and the operation that the processor 3000 acquires the N target Wi-Fi connection records corresponding to the target AP from the historical Wi-Fi connection data according to the network environment information of the target AP includes that: a current position of the mobile terminal is acquired; P Wi-Fi connection records including positions of the mobile terminal in a preset range which is centered at the current position are determined from the historical Wi-Fi connection data; and the N target Wi-Fi connection records are selected from the P Wi-Fi connection records according to a BSSID of the target AP, where P is an integer greater than or equal to N.

In at least one embodiment, the operation that the processor 3000 acquires the N target Wi-Fi connection records corresponding to the target AP from the historical Wi-Fi connection data according to the network environment information of the target AP includes that: BSSIDs of M APs of which signal strength values are higher than a preset threshold value around the target AP are acquired, where M is a positive integer; Q Wi-Fi connection records are determined from the historical Wi-Fi connection data according to an SSID and encryption scheme of the target AP; and the BSSIDs of the M APs are matched with neighbor information in each target Wi-Fi connection record in the Q target Wi-Fi connection records to obtain the N target Wi-Fi connection records, Here the neighbor information in the target Wi-Fi connection records includes the BSSIDs of X APs in the BSSIDs of the M APs, where X is a positive integer less than or equal to M.

In at least one embodiment, the operation that the processor 3000 accesses the target AP according to the N target Wi-Fi connection records includes: the N target Wi-Fi connection records are stored in a preset list; K passwords corresponding to the N target Wi-Fi connection records in the preset list are acquired, where K is an integer less than or equal to N; and the target AP is accessed according to the K passwords.

Further, in at least one embodiment, the operation that the processor 3000 accesses the target AP according to the K passwords includes: an occurrence frequency of each of the K passwords in the preset list are determined to obtain K frequency values; a priority sequence of the K passwords is determined according to the K frequency values; and a password is selected from the K passwords according to the priority sequence, and the target AP is accessed according to the SSID and encryption scheme of the target AP.

An embodiment of the disclosure further provides a computer storage medium, Here the computer storage medium may store a program, and when the program is executed, part or all of operations of any Wi-Fi connection method recorded in the abovementioned method embodiments are included.

Although the invention is described herein with reference to each embodiment, those skilled in the art may understand and implement other variations of the disclosed embodiments by viewing the drawings, the disclosed contents and the appended claims in a process of implementing the invention required to be protected. In the claims, "comprising" does not exclude other parts or steps, and "a" or "one" does not exclude a multiple condition. A single processor or another unit may realize a plurality of functions listed in the claims. Some measures are recorded in different claims, but it does not mean that these measures cannot be combined to achieve good effects.

Those skilled in the art should know that the embodiment of the disclosure may be provided as a method, a device (equipment) or a computer program product. Therefore, the invention may adopt a form of pure hardware embodiment, pure software embodiment or combined software and hardware embodiment. Moreover, the invention may adopt a form of computer program product implemented on one or more computer-available storage media (including, but not limited to, a disk memory, a Compact Disc Read-Only Memory (CD-ROM) and an optical memory) including computer-available program codes. The computer program is stored/distributed in a proper medium and is provided together with other hardware or serves as a part of the hardware, and may also be distributed in another form, for example, through the Internet or another wired or wireless telecommunication system.

The invention is described with reference to flowcharts and/or block diagrams of the method, device (equipment) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing device to generate a machine, so that a device for realizing 3Q a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

Although the invention is described with reference to specific characteristics and the embodiments, obviously, various modifications and combinations may be made to the invention without departing from the spirit and scope of the invention. Correspondingly, the specification and the drawings are only exemplary descriptions about the invention defined by the appended claims, and are considered to cover any and all modifications, variations, combinations or equivalents in the scope of the invention. Obviously, those skilled in the art may make various modifications and transformations to the invention without departing from the spirit and scope of the invention. Therefore, if these modifications and transformations of the invention belong to the scope of the claims of the invention and equivalent technologies thereof, the invention is also intended to include these modifications and transformations.

The invention claimed is:

1. A Wireless Fidelity (Wi-Fi) connection method, applied to a mobile terminal, the method comprising:
    acquiring network environment information of a target Access Point (AP);
    acquiring N target Wi-Fi connection records corresponding to the target AP from historical Wi-Fi connection data according to the network environment information of the target AP, the historical Wi-Fi connection data comprising M Wi-Fi connection records, where M is a positive integer and N is a positive integer less than or equal to M; and
    accessing the target AP according to the N target Wi-Fi connection records,
    wherein the network environment information comprises identifications and signal strengths of APs around the target AP, and
    wherein the acquiring N target Wi-Fi connection records corresponding to the target AP from historical Wi-Fi connection data to then network environment information of the target AP comprises:
    selecting M APs of which signal strength values are higher than a preset threshold value, around the target AP, where M is a positive integer;
    determining Q Wi-Fi connection records from the historical Wi-Fi connection data according to a Service Set Identifier (SSID) and an encryption scheme of the target AP; and
    matching the identifications of the M APs with neighbor information in each of the Q target Wi-Fi connection records to obtain the N target Wi-Fi connection records, wherein the neighbor information in each of the target Wi-Fi connection records con rises the identifications of X APs in the identifications of the M APs, where X is a positive integer less than or equal to M.

2. The method according to claim 1, wherein the network environment information comprises a current position of the mobile terminal, and
    wherein the acquiring the N target Wi-Fi connection records corresponding to the target AP from the historical Wi-Fi connection data according to the network environment information of the target AP comprises:

determining, from the historical Wi-Fi connection data, P Wi-Fi connection records comprising positions of the mobile terminal in a preset range which is centered at the current position; and selecting the N target Wi-Fi connection records from the P Wi-Fi connection records according to an identification of the target AP, where P is an integer greater than or equal to N.

3. The method according to claim 2, wherein the accessing the target AP according to the N target Wi-Fi connection records comprises:

storing the N target Wi-Fi connection records in a preset list;

acquiring K passwords from the N target Wi-Fi connection records in the preset list, where K is an integer less than or equal to N; and accessing the target AP according to one of the K passwords.

4. The method according to claim 3, wherein the accessing the target AP according to one of the K passwords comprises:

determining an occurrence frequency of each of the K passwords in the preset list to obtain K frequency values;

determining a priority sequence of the K passwords according to the K frequency values;

selecting a password from the K passwords, one at a time, according to the priority sequence; and trying to access the target AP according to the SSID of the target AP, the selected password and the encryption scheme.

5. The method according to claim 1, further comprising: before acquiring the N target Wi-Fi connection records corresponding to the target AP, acquiring a first password for accessing the target AP; and when authentication with the first password fails, acquiring the N target Wi-Fi connection records corresponding to the target AP from the historical Wi-Fi connection data according to the network environment information of the target AP.

6. A mobile terminal, comprising:

a processor and a memory, wherein the processor calls a code or instruction in the memory to execute a Wireless Fidelity (Wi-Fi) connection method, the method comprising:

acquiring network environment information of a target Access Point (AP);

acquiring N target Wireless Fidelity (Wi-Fi) connection records corresponding to the target AP from historical Wi-Fi connection data according to the network environment information of the target AP, the historical Wi-Fi connection data comprising M Wi-Fi connection records, where M is a positive integer and N is a positive integer less than or equal to M; and accessing the target AP according to the N target Wi-Fi connection records, wherein the network environment information comprises identifications and signal strengths of APs around the target AP, and wherein the acquiring N target Wi-Fi connection records corresponding to the target AP from historical Wi-Fi connection data according to the network environment information of the target AP comprises:

selecting M APs of which signal strength values are higher than a preset threshold value, around the target AP, where M is a positive integer;

determining Q Wi-Fi connection records from the historical Wi-Fi connection data according to a Service Set Identifier SSID and encryption scheme of the target AP; and matching the identifications of the M APs with neighbor information in each of the Q target Wi-Fi connection records to obtain the N target Wi-Fi connection records, wherein the neighbor inform n in each of the target Wi-Fi connection rises the identifications of X APs in the identifications of e M APs, where X is a positive integer less than or equal to M.

7. The mobile terminal according to claim 6, wherein the network environment information comprises a current position of the mobile terminal, and wherein the acquiring the N target Wi-Fi connection records corresponding to the target AP from the historical Wi-Fi connection data according to the network environment information of the target AP comprises:

determining, from the historical Wi-Fi connection data, P Wi-Fi connection records comprising positions of the mobile terminal in a preset range which is centered at the current position; and selecting the N target Wi-Fi connection records from the P Wi-Fi connection records according to an identification of the target AP, where P is an integer greater than or equal to N.

8. The mobile terminal according to claim 7, wherein the accessing the target AP according to the N target Wi-Fi connection records comprises:

storing the N target Wi-Fi connection records in a preset list;

acquiring K passwords from the N target Wi-Fi connection records in the preset list, where K is an integer less than or equal to N; and accessing the target AP according to one of the K passwords.

9. The mobile terminal according to claim 6, wherein the accessing the target AP according to one of the K passwords comprises:

determining an occurrence frequency of each of the K passwords in the preset list to obtain K frequency values;

determining a priority sequence of the K passwords according to the K frequency values;

selecting a password from the K passwords, one at a time, according to the priority sequence; and trying to access the target AP according to the SSID of the target AP, the selected password and the encryption scheme.

10. The mobile terminal according to claim 6, wherein the method further comprises: before acquiring the N target Wi-Fi connection records corresponding to the target AP, acquiring a first password for accessing the AP; and when authentication with the first password fails, acquiring the N target Wi-Fi connection records corresponding to the target AP from the historical Wi-Fi connection data according to the network environment information of the target AP.

11. A non-transitory computer readable storage medium, storing instructions, which, when executed by a processor, cause the processor to execute a Wireless Fidelity (Wi-Fi) connection method, the method comprising:

acquiring network environment information of a target Access Point (AP);

acquiring N target Wireless Fidelity (Wi-Fi) connection records corresponding to the target AP from historical Wi-Fi connection data according to the network environment information of the target AP, the historical Wi-Fi connection data comprising M Wi-Fi connection records, where M is a positive integer and N is a positive integer less than or equal to M; and accessing the target AP according to the N target Wi-Fi connection records, wherein the network environment information comprises identifications and signal strengths of APs around the target AP, and the acquiring N target Wi-Fi connection records corresponding to the target AP from historical Wi-Fi connection data according to the network environment information of the target AP comprises:

selecting M APs of which signal strength values are higher than a preset threshold value, around the target AP, where M is a positive integer;

determining Q Wi-Fi connection records from the historical Wi-Fi connection data according to a Service Set Identifier (SSID) and encryption scheme of the target AP; and matching the identifications of the M APs with neighbor information in each of the Q target Wi-Fi connection records to obtain the N target Wi-Fi connection records, wherein the neighbor information in each of the target Wi-Fi connection records comprises the identifications of X APs in the identifications of the M APs, where X is a positive integer less than or equal to M.

12. The non-transitory computer readable storage medium according to claim 11, wherein the network environment information comprises a current position of the mobile terminal, and wherein the acquiring the N target Wi-Fi connection records corresponding to the target AP from the historical Wi-Fi connection data according to the network environment information of the target AP comprises:

determining, from the historical Wi-Fi connection data, P Wi-Fi connection records comprising positions of the mobile terminal in a preset range which is centered at the current position; and selecting the N target Wi-Fi connection records from the P Wi-Fi connection records according to an identification of the target AP, where P is an integer greater than or equal to N.

13. The non-transitory computer readable storage medium according to claim 12, wherein the accessing the target AP according to the N target Wi-Fi connection records comprises:

storing the N target Wi-Fi connection records in a preset list;

acquiring K passwords from the N target Wi-Fi connection records in the preset list, where K is an integer less than or equal to N; and accessing the target AP according to one of the K passwords.

14. The non-transitory computer readable storage medium according to claim 11, wherein the accessing the target AP according to one of the K passwords comprises:

determining an occurrence frequency of each of the K passwords in the preset list to obtain K frequency values;

determining a priority sequence of the K passwords according to the K frequency values;

selecting a password from the K passwords, one at a time, according to the priority sequence; and trying to access the target AP according to the SSID of the target AP, the selected password and the encryption scheme.

15. The non-transitory computer readable storage medium according to claim 11, wherein the method further comprises: before acquiring the N target Wi-Fi connection records corresponding to the target AP, acquiring a first password for accessing the AP; and when authentication with the first password fails, acquiring the N target Wi-Fi connection records corresponding to the target AP from the historical Wi-Fi connection data according to the network environment information of the target AP.

* * * * *

UNITED STATES PATENT AND TRADEMARK OFFICE
CERTIFICATE OF CORRECTION

PATENT NO.         : 10,638,319 B2                                              Page 1 of 1
APPLICATION NO.    : 15/794488
DATED              : April 28, 2020
INVENTOR(S)        : Botao Cu et al.

It is certified that error appears in the above-identified patent and that said Letters Patent is hereby corrected as shown below:

On the Title Page

Item (73) Assignee:
"GUANGDONG OPPO MOBILE TELECOMMUNICATIONS CORP., LTD., Dongguan (CN)"

Should read:
--GUANGDONG OPPO MOBILE TELECOMMUNICATIONS CORP., LTD., Dongguan, Guangdong (CN)--

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*